M. G. OTIS.
HOSE COUPLING.
APPLICATION FILED JUNE 12, 1908.
927,589.
Patented July 13, 1909.
3 SHEETS—SHEET 1.
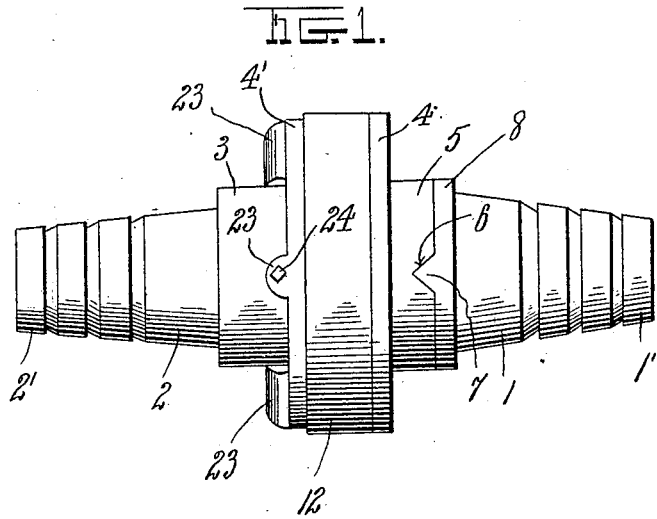
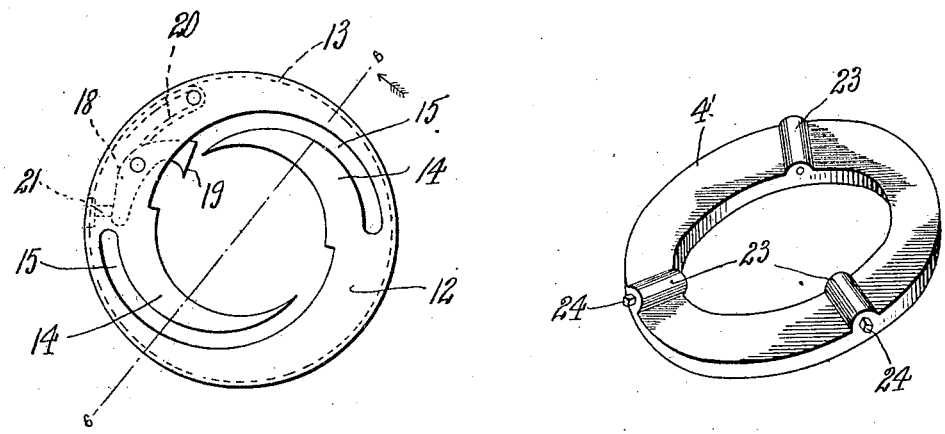
Witnesses
J. H. Crawford
M. J. Miller
Inventor
Milton G. Otis,
By Chandler & Chandler
Attorney M. G. OTIS.
HOSE COUPLING.
APPLICATION FILED JUNE 12, 1908.
927,589.
Patented July 13, 1909.
3 SHEETS—SHEET 2.
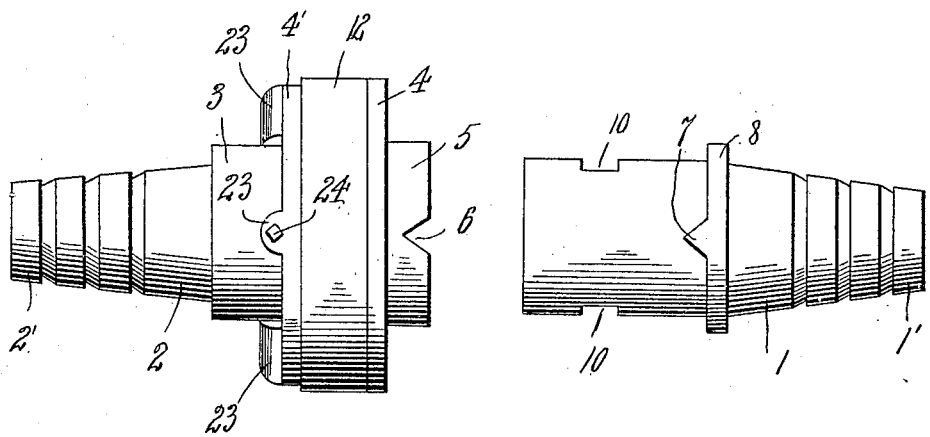
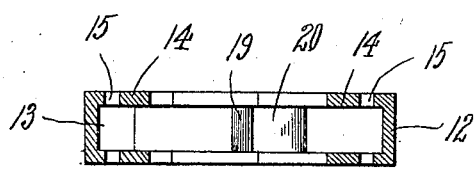
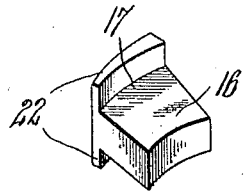
Witnesses
J. H. Crawford
M. T. Miller
Inventor
Milton G. Otis,
By Chandler & Chandler
Attorneys

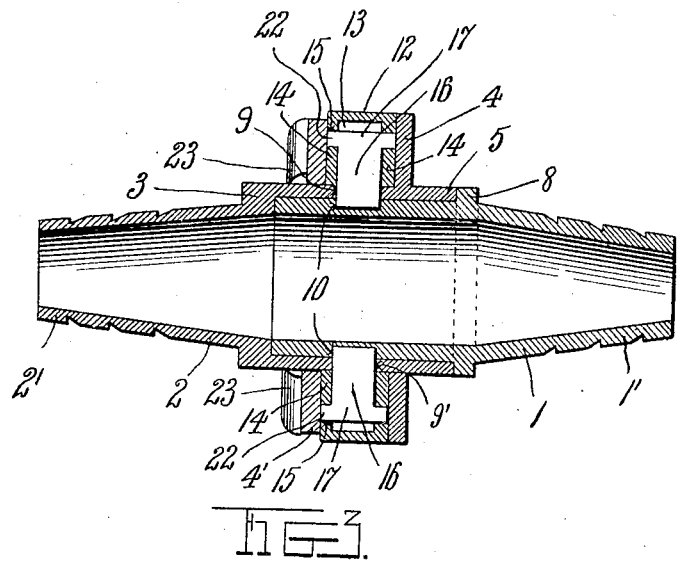
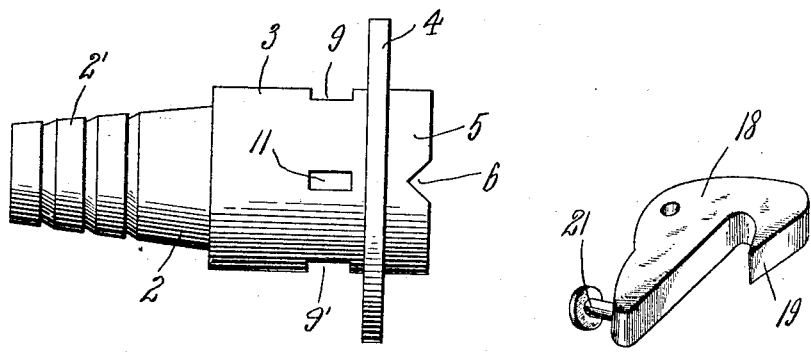

UNITED STATES PATENT OFFICE.

MILTON G. OTIS, OF ANIWA, WISCONSIN.

HOSE-COUPLING.

No. 927,589.  Specification of Letters Patent.  Patented July 13, 1909.

Application filed June 12, 1908. Serial No. 438,233.

*To all whom it may concern:*

Be it known that I, MILTON G. OTIS, a citizen of the United States, residing at Aniwa, in the county of Shawano, State of Wisconsin, have invented certain new and useful Improvements in Hose-Couplings; and I do hereby declare the following to be a full, clear, and exact description of the invention, such as will enable others skilled in the art to which it appertains to make and use the same.

This invention has relation to hose couplings generally, and it is particularly adapted for use in connecting hose to hydrants, or other contrivances for extinguishing fires, lawn and garden hose, et cetera.

It is the purpose of the invention to provide improvements whereby hose can be easily and quickly connected without the use of wrenches, spanners or other extraneous implements, avoiding screw-threads and other inequalities at places where dirt would be liable to collect and interfere with the coupling.

It is, moreover the object of the invention to provide a hose-coupling that will be thoroughly efficient, be simple in construction, and readily manufactured, considering the results accomplished by it.

Other objects and purposes will appear from the description and claims hereinafter given and made.

The drawings hereto annexed which form a part of this specification, fully illustrate the nature of the invention and the best form now considered by me of carrying the improvements into effect, though it is recognized that changes of a mechanical nature may be made in parts and features without departing from the general nature or spirit of the invention.

Of the said drawings, Figure 1 is a side elevation, showing the two prime members entering into the invention as coupled, the hose proper being omitted. Fig. 2 is a similar view, showing the two principal members separated. Fig. 3 is a longitudinal section of the invention, as shown in Fig. 1. Fig. 4 is a plan view of the locking-ring or nut detached. Fig. 5 is a separate side elevation of the female member free from all of its attachments and illustrating some of the necessary features of this construction. Fig. 6 is a section of the locking ring on the line 6—6 of Fig. 4. Fig. 7 is a perspective view of the spring pressed dog. Fig. 8 is a perspective view of the detachable guard-ring. Fig. 9 is a like view of one of the coupling-blocks and its connected eccentrically-curved finger.

Similar characters of reference designate similar parts and features wherever they occur.

The invention may be composed of brass or any other suitable material, and as has hereinbefore been intimated comprises a male member 1, and a female member 2, which are provided with extensions 1' and 2', respectively, constructed as is common or suitable for the attachment of the ends of the hose (not shown) thereto. The female member is tapered slightly interiorly, and the exterior of the portion of the male member is correspondingly formed to secure a tight joint when the two members are connected, and to withstand the pressure of water from within.

The enlarged hollow part 3 of the female member, I have chosen for the purposes of this specification, to term the main "hull," and it is provided with a guard ring 4, on its outer surface that may be cast therewith. Beyond the ring, 4, there is an extension 5, in the edges of which on opposite sides there are formed triangular notches 6, to receive corresponding triangular points 7, formed on the opposite edge of the annular rib 8, cast on the male member 2, this provision assisting in preventing one member from turning independent of the other when they are connected, and bringing them into proper alinement when they are brought together, as will presently more forcibly appear. Near the guard-ring 4, there are two slots 9 and 9' made through the hull 3 on opposite sides thereof and opposite or inside of the said slots on the exterior of the male member there are corresponding recesses 10 made in the exterior surface thereof. Between two of the recesses 10, there is also a small and shallow indentation 11, made in the outer surface of the male member 1.

The numeral 12 designates a locking ring or nut adapted to fit over the hull 3, with one of its sides resting against the inside of the guard-ring 4. The said locking-ring 12 is annularly grooved internally, as indicated at 13, leaving relatively thin portions 14, on its opposite sides, which have eccentric slots 15, made therethrough.

The numeral 16 designates short blocks, the heads 17 of which are arranged in the eccentric grooves 15, while the inner reduced portions of said blocks extend radially inward through the slots 9, and into the recesses 10 on the external surface of the male member, when the locking ring is turned to couple the two members.

In the groove 13 and between the ends of the eccentric slots 15, there is pivoted in the sides 14 a dog having a catch 19 on one end, which is normally pressed inward by a spring 20. The opposite end of the said dog is provided with a pin 21 which extends radially out through a hole formed in the locking-ring, and the outer end of said pin is normally flush with the peripheral surface of the former, when the members are coupled.

The heads of the blocks 16 are provided on opposite sides with laterally extended lips 22 which project through the eccentric grooves 15, and as the lower ends of the blocks extend into the slots of the hull so as to hold them in place, when the locking ring is turned back the lips 22 will move around in the eccentric grooves 15, projecting the said inner ends of the blocks into the said peripheral recesses 10 of the male member, coupling the two members together so that they cannot be separated by lengthwise strain or pull thereon. At the same time, the dog 18 will be moved around on the hull, until the point of the catch 19 engages or catches in the end of the slot 9', behind the block therein which slot 9' is made a little longer than the slot 9. This locks the coupling nut or wing on the main hull 3 against being accidentally turned thereon when the hose is dragged around over the ground, thus preventing unintentional separation of the coupling members. When the point of the catch 19 on the dog is in the end of the slot 9', the outer end of the actuating pin 20 will be slightly below the periphery of the locking-ring 12. When it is desired to separate or uncouple the members 1 and 2, the end of a finger of the hand will be pressed on the outer end of the pin 20 of the pivoted dog, 18, thus raising the point of the catch 19 out of the slot 9', when the locking ring or nut may be turned back against the stress of the spring 20, until the said catch engages the shallow notch 11, which will allow the two coupling members to be pulled apart but maintain them in proper relative position for coupling again when desired. The blocks 16 will be so shaped or constructed that when they are pressed into the slots 9 and 9', they will assist in effecting a tight joinder or coupling of the two members.

To keep the locking ring 12 in place on the hull when the coupling is in use, and yet allow it to be slipped off when necessary, on the side of the said coupling ring opposite the side resting against the guard ring 4 is another guard ring 4', removably secured to the periphery of the hull in any suitable manner. The means shown in the drawings being a plurality of radially perforated swells 23 formed on the outside of the guard ring 4' through which swells screw-bolts 24 extend into the main hull, their heads being countersunk in the swells when turned "home" so that they will not catch upon any object with which they might otherwise come into contact.

The manner of assembling the parts and disconnecting them, as also the purposes and advantages of the invention will be understood from the foregoing description without further explanation.

What is claimed is:

1. In a hose coupling, a male member provided with a notch in the outer side thereof, a female member having an opening therethrough registering with said notch, a block having lips projecting from each side thereof slidable in said opening and adapted to be engaged in the notch, and a ring rotatable on the female member having a cross section of U-shape and being provided with opposed eccentric slots in the side walls of the U-shaped section, said block being held between said side walls and its lips engaged with said slots.

2. In a hose coupling, a male member provided with a notch in the outer side thereof, a female member having an opening therethrough registering with said notch, a block having lips projecting from each side thereof slidable in said opening and adapted to engage said notch, a ring rotatable on the female member having a cross section of U-shape and being provided with opposed eccentric slots in the side walls of the U-shaped section, said block being held between said side walls with its lips engaged in said slots, and collars on the female member to retain said ring thereon and cover said slots.

3. In a hose coupling, a male member provided with a notch in the outer side thereof, a female member having an opening therethrough registering with said notch, a block having lips projecting from each side thereof slidable in said opening and adapted to engage said notch, a ring rotatable on the female member having a cross section of U-shape and being provided with opposed eccentric slots in the side walls of the U- shaped section, said block being held between said side walls with its lips engaged in said slots, collars on the female member to retain said ring thereon and cover said slots, and releasable means to hold said ring from rotation when the parts are in locked position.

In testimony whereof, I affix my signature, in presence of two witnesses.

MILTON G. OTIS.

Witnesses:
F. W. DE WITT,
CHAS. C. VOGL.